United States Patent
Jiang et al.

(10) Patent No.: US 9,200,583 B2
(45) Date of Patent: Dec. 1, 2015

(54) CONCURRENTLY ADJUSTING INTERRELATED CONTROL PARAMETERS TO ACHIEVE OPTIMAL ENGINE PERFORMANCE

(75) Inventors: Li Jiang, Ann Arbor, MI (US); Donghoon Lee, Ann Arbor, MI (US); Hakan Yilmaz, Ann Arbor, MI (US); Anna Stefanopoulou, Ann Arbor, MI (US)

(73) Assignee: Robert Bosch GmbH, Stuttgart (DE)

( * ) Notice: Subject to any disclaimer, the term of this patent is extended or adjusted under 35 U.S.C. 154(b) by 737 days.

(21) Appl. No.: 13/435,562

(22) Filed: Mar. 30, 2012

(65) Prior Publication Data

US 2012/0253636 A1 Oct. 4, 2012

Related U.S. Application Data

(60) Provisional application No. 61/470,113, filed on Mar. 31, 2011.

(51) Int. Cl.
*F02D 28/00* (2006.01)
*F02D 13/02* (2006.01)
(Continued)

(52) U.S. Cl.
CPC ........ *F02D 41/2438* (2013.01); *F02D 13/0215* (2013.01); *F02D 37/02* (2013.01);
(Continued)

(58) Field of Classification Search
CPC ... F02D 35/023; F02D 41/14; F02D 41/1404; F02D 41/1405; F02D 41/1479; F02D 2200/00; Y02T 10/44; Y02T 10/47
USPC .............. 701/102–106, 109, 110, 114; 123/3, 123/305, 306, 308, 435, 478, 480
See application file for complete search history.

(56) References Cited

U.S. PATENT DOCUMENTS

| | | | |
|---|---|---|---|
| 4,745,553 A | 5/1988 | Raven et al. | |
| 5,168,853 A | 12/1992 | Kittelson et al. | |

(Continued)

FOREIGN PATENT DOCUMENTS

| | | |
|---|---|---|
| DE | 10006264 | 8/2001 |
| EP | 0345942 | 12/1989 |

(Continued)

OTHER PUBLICATIONS

Search Report from the European Patent Office for Application No. 12162862.2 dated Aug. 29, 2013 (6 pages).

(Continued)

*Primary Examiner* — John Kwon
*Assistant Examiner* — Johnny H Hoang
(74) *Attorney, Agent, or Firm* — Michael Best & Friedrich LLP

(57) ABSTRACT

Methods and systems for real-time engine control optimization are provided. A value of an engine performance variable is determined, a value of a first operating condition and a value of a second operating condition of a vehicle engine are detected, and initial values for a first engine control parameter and a second engine control parameter are determined based on the detected first operating condition and the detected second operating condition. The initial values for the first engine control parameter and the second engine control parameter are adjusted based on the determined value of the engine performance variable to cause the engine performance variable to approach a target engine performance variable. In order to cause the engine performance variable to approach the target engine performance variable, adjusting the initial value for the first engine control parameter necessitates a corresponding adjustment of the initial value for the second engine control parameter.

21 Claims, 13 Drawing Sheets

(51) Int. Cl.
*F02D 41/24* (2006.01)
*F02D 37/02* (2006.01)
*F02P 5/153* (2006.01)
F02D 19/08 (2006.01)
F02D 41/14 (2006.01)
F02D 41/00 (2006.01)
F02D 41/08 (2006.01)

(52) U.S. Cl.
CPC .............. *F02P 5/153* (2013.01); *F02D 19/084* (2013.01); *F02D 41/08* (2013.01); *F02D 41/1406* (2013.01); *F02D 41/1408* (2013.01); *F02D 41/248* (2013.01); *F02D 41/2432* (2013.01); *F02D 41/2445* (2013.01); *F02D 2041/001* (2013.01); *F02D 2041/1419* (2013.01); *F02D 2041/1432* (2013.01); *Y02T 10/18* (2013.01); *Y02T 10/36* (2013.01); *Y02T 10/46* (2013.01)

(56) References Cited

U.S. PATENT DOCUMENTS

| | | | |
|---|---|---|---|
| 5,243,951 | A | 9/1993 | Nakaniwa |
| 5,558,064 | A | 9/1996 | Buslepp |
| 5,568,377 | A | 10/1996 | Seem et al. |
| 5,713,332 | A | 2/1998 | Adler |
| 6,286,478 | B1 | 9/2001 | Atago et al. |
| 6,425,374 | B1 | 7/2002 | Schmitz et al. |
| 6,543,418 | B2 | 4/2003 | Lavy |
| 6,778,898 | B1* | 8/2004 | Bidner et al. ................ 701/109 |
| 6,807,470 | B2 | 10/2004 | Hara |
| 6,928,361 | B2* | 8/2005 | Nakayama et al. ........... 701/104 |
| 6,971,368 | B2* | 12/2005 | Uchiyama ..................... 123/359 |
| 7,107,142 | B2* | 9/2006 | Harada et al. ................ 701/114 |
| 7,657,361 | B2 | 2/2010 | Inoue et al. |
| 7,698,051 | B2 | 4/2010 | Yasui |
| 7,827,813 | B2 | 11/2010 | Seem |
| 2008/0228383 | A1* | 9/2008 | Nakagawa et al. ........... 701/113 |
| 2008/0288091 | A1 | 11/2008 | Yasui |
| 2009/0266336 | A1* | 10/2009 | Morimoto et al. ....... 123/406.47 |
| 2010/0106328 | A1 | 4/2010 | Li et al. |
| 2010/0106331 | A1 | 4/2010 | Li et al. |
| 2011/0106408 | A1* | 5/2011 | Morimoto et al. ........... 701/103 |
| 2012/0239270 | A1* | 9/2012 | Ikeda et al. .................. 701/102 |

FOREIGN PATENT DOCUMENTS

| | | |
|---|---|---|
| EP | 1387067 | 2/2004 |
| WO | 2004048762 | 6/2004 |

OTHER PUBLICATIONS

Search Report from the European Patent Office for Application No. 12162860.6 dated Aug. 29, 2013 (6 pages).
Search Report from the European Patent Office for Application No. 12162858.0 dated Jul. 31, 2012 (5 pages).
Search Report from the European Patent Office for Application No. 12162864.8 dated Aug. 7, 2012 (5 pages).
Larsson et al., "Self-optimising control of an SI-engine using a torque sensor", Control Engineering Practice, vol. 16, Issue 5, May 2008.
Popovic et al., "Extremum Seeking Methods for Optimization of Variable Cam Timing Engine Operation", IEEE Transactions on Control Systems Technology, vol. 14, No. 3, May 2006.
Lee et al., "Preliminary Results on Optimal Variable Valve Timing and Spark Timing Control via Extremum Seeking", 2010 IFAC Symposium on Mechatronic Systems, Cambridge, MA, Sep. 2010.
European Office Action for Application No. 12162864.8 dated Dec. 3, 2013 (4 pages).
European Patent Office Action for Application No. 12162864.8 dated Sep. 12, 2014 (3 pages).

* cited by examiner

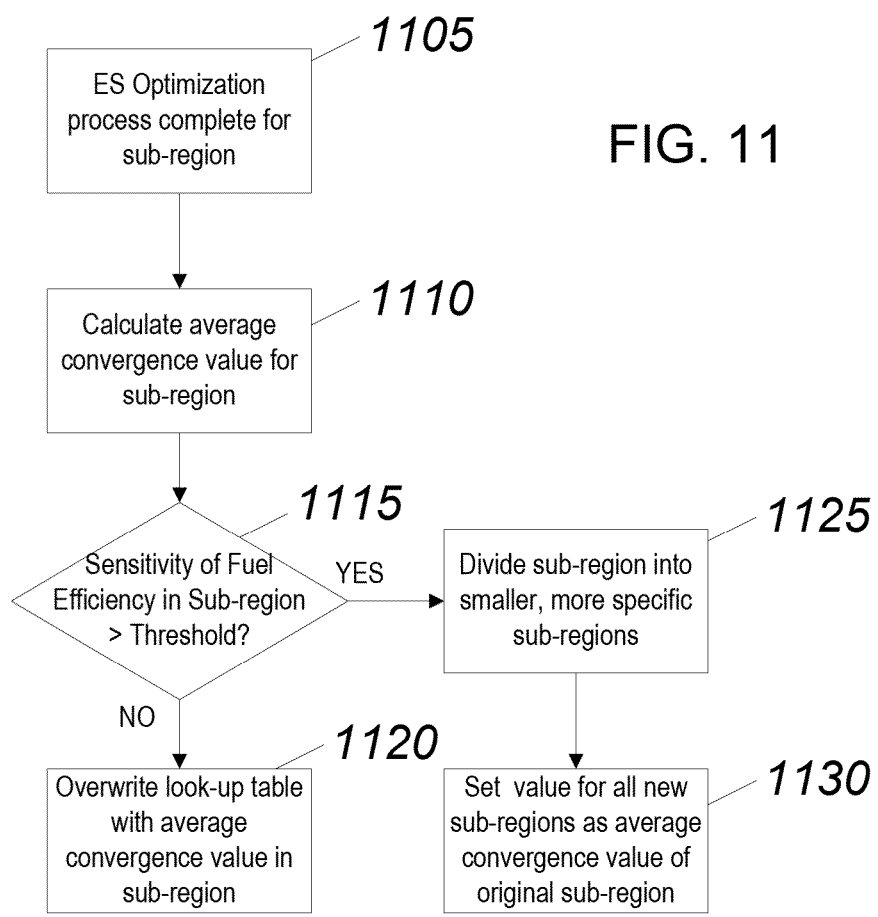

CONCURRENTLY ADJUSTING INTERRELATED CONTROL PARAMETERS TO ACHIEVE OPTIMAL ENGINE PERFORMANCE

CROSS-REFERENCE TO RELATED APPLICATIONS

This application claims priority to U.S. Provisional Application No. 61/470,113, filed Mar. 31, 2011, and titled "ENGINE CONTROL OPTIMIZATION USING EXTREMUM SEEKING," the entirety of which is incorporated herein by reference.

STATEMENT REGARDING FEDERALLY SPONSORED RESEARCH OR DEVELOPMENT

This invention was made with government support under grant No. DE-FC26-07NT43274 awarded by the Department of Energy. The government has certain rights in the invention.

BACKGROUND

Embodiments of the present invention relate to real-time engine control optimization.

SUMMARY

In one embodiment, the invention provides a method for real-time engine control optimization. The method includes determining a value of an engine performance variable, detecting a value of a first operating condition and a value of a second operating condition of a vehicle engine, and determining an initial value for a first engine control parameter and an initial value for a second engine control parameter based on the detected first operating condition and the detected second operating condition. The initial value for the first engine control parameter is adjusted based on the determined value of the engine performance variable to cause the engine performance variable to approach a target engine performance variable. The initial value for the second engine control parameter is also adjusted based on the determined value of the engine performance variable to cause the engine performance variable to approach the target engine performance variable. Operation of the vehicle engine is then controlled based on the adjusted initial value for the first engine control parameter and the adjusted initial value for the second engine control parameter. In order to cause the engine performance variable to approach the target engine performance variable, the act of adjusting the initial value for the first engine control parameter necessitates a corresponding adjustment of the initial value for the second engine control parameter.

In some embodiments, the initial value for the first engine control parameter is determined by identifying an initial value that corresponds to the detected value of the first operating condition and the detected value of the second operating condition of the vehicle engine as defined by a first engine map look-up table. The first engine map look-up table defines a plurality of operating sub-regions each corresponding to a range of values for the first operating condition and a range of values for the second operating condition. The first engine map look-up table also defines a first engine control parameter value corresponding to each operating sub-region. Additionally, the method further includes identifying an optimal adjusted value of the first engine control parameter that causes the engine performance variable to converge toward the target value at the end of the engine optimization mode when the first operating condition and the second operating condition are within a first operating sub-region of the first engine map. An average optimal adjusted value of the first engine control parameter is calculated for the first operating sub-region of the first engine map based on the optimal adjusted value of the first engine control parameter from a plurality of executions of the engine optimization mode. The first engine map is then updated by replacing the first engine control parameter value corresponding to each operating sub-region with the average optimal adjusted value for the first engine control parameter for the first operating sub-region of the first engine map.

In another embodiment, the invention provides an engine control unit ("ECU") configured to determine a value of an engine performance variable, detect a value of a first operating condition and a value of a second operating condition of a vehicle engine, and determine an initial value for a first engine control parameter and an initial value for a second engine control parameter based on the detected first operating condition and the detected second operating condition. The initial value for the first engine control parameter is adjusted based on the determined value of the engine performance variable to cause the engine performance variable to approach a target engine performance variable. The initial value for the second engine control parameter is also adjusted based on the determined value of the engine performance variable to cause the engine performance variable to approach the target engine performance variable. Operation of the vehicle engine is then controlled based on the adjusted initial value for the first engine control parameter and the adjusted initial value for the second engine control parameter. In order to cause the engine performance variable to approach the target engine performance variable, the act of adjusting the initial value for the first engine control parameter necessitates a corresponding adjustment of the initial value for the second engine control parameter.

In yet another embodiment, the invention provides an engine control unit ("ECU") configured to determine a fuel efficiency of a vehicle engine, detect an engine speed and an engine load of the vehicle engine, and determine an initial value for variable valve timing ("VVT") and an initial value for spark timing based on the detected engine speed and the detected engine load. The initial value for the VVT is adjusted based on the determined fuel efficiency to cause the fuel efficiency of the vehicle engine to approach a maximum value. The initial value for the spark timing is also adjusted based on the determined fuel efficiency to cause the fuel efficiency of the vehicle engine to approach the maximum value. Operation of the vehicle engine is then controlled based on the adjusted initial VVT and the adjusted initial spark timing. The act of adjusting the initial value for the VVT necessitates a corresponding adjustment of the initial value for the spark timing in order to maximize the fuel efficiency of the vehicle engine.

Other aspects of the invention will become apparent by consideration of the detailed description and accompanying drawings.

BRIEF DESCRIPTION OF THE DRAWINGS

FIG. 11 illustrates a method of updating the engine map look-up tables stored on the memory of the ECU after completion of the ES optimization process.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
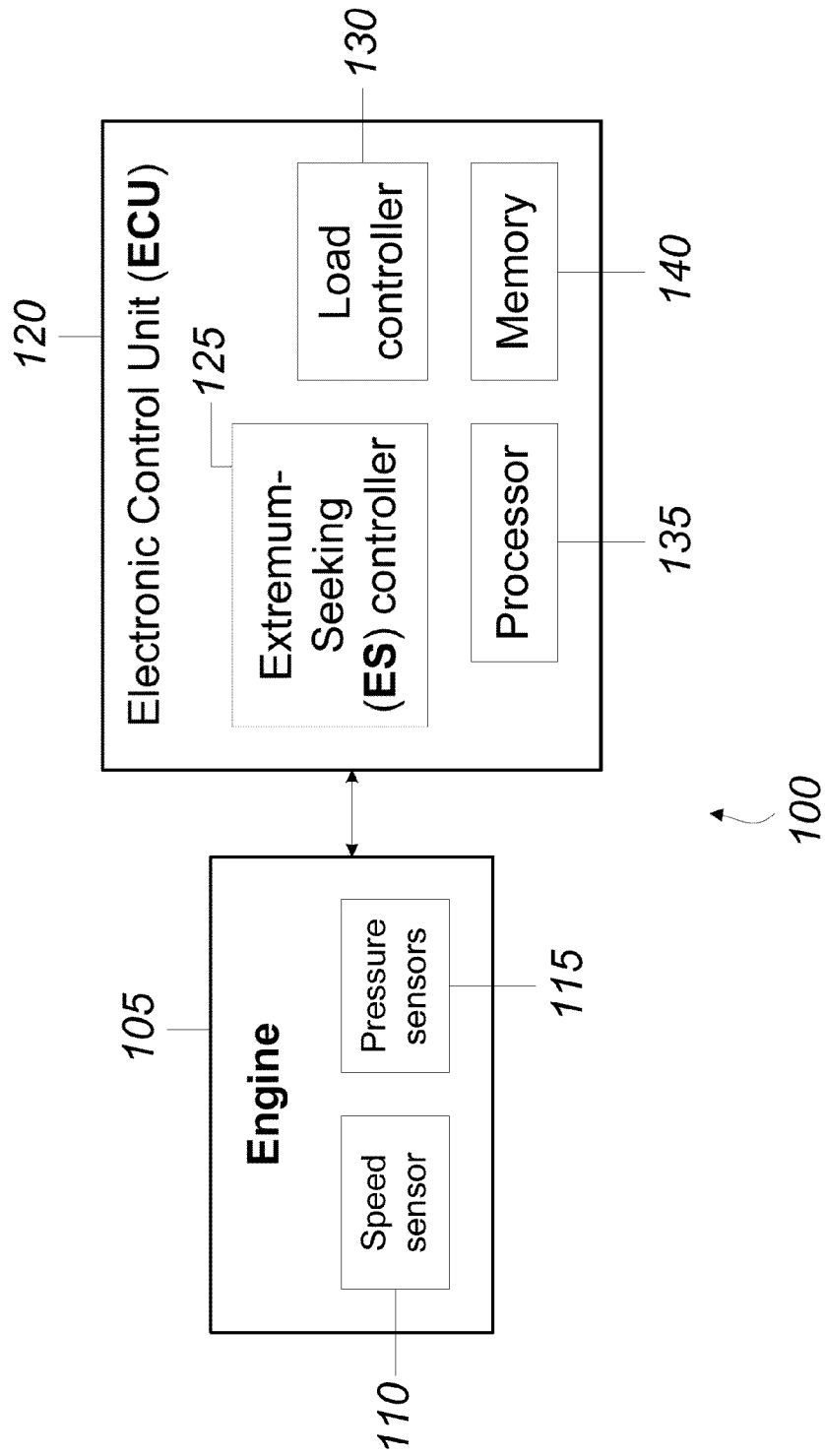
FIG. 1 is a schematic illustration of a real-time engine control optimization system including an engine having a speed sensor and pressure sensors, and an electronic control unit ("ECU") having a processor, a memory, an extremum-seeking controller and a load controller.

FIG. 1 illustrates a real-time engine control optimization system 100 for a vehicle. The system 100 is implemented on the vehicle and includes an engine 105 equipped with multiple sensors including, for example, a speed sensor 110 and pressure sensors 115. An electronic control unit ("ECU") 120 is in communication with the various sensors and actuators of the engine 105. The ECU 120 receives data from the speed sensor 110 and the pressure sensors 115 and processes that data to control the operation of the engine 105. The ECU 120 includes at least one processor 135 and at least one memory 140. The memory 140 stores instructions that are executed by the processor 135 to provide the functionality of the ECU 120. Among other operations, the ECU 120 implements an extremum-seeking ("ES") controller 125 and a load controller 130.

In some embodiments, the engine 105 is a modern internal combustion engine that is capable of operating on various blends of gasoline and ethanol, also known as a flex-fuel engine. In some embodiments, the engine 105 is designed with advanced technologies such as direct-injection ("DI"), turbocharging ("TC"), and variable valve timing ("VVT"). As described above, the ECU 120 receives data captured by the speed sensor 110, the pressure sensors 115, and other sensors of the engine 105. The ECU 120 processes the received data and, as a result, operates the engine 105 such that target engine performance is achieved as described in further detail below. In particular, the ECU 120 provides extremum seeking control that continually monitors how the engine 105 performs under specific operating conditions (e.g., engine speed, engine load, etc.) when specific engine control parameters (e.g., spark timing, variable valve timing, etc.) are applied. The ECU 120 uses this information to adjust one or more engine control parameters to improve the performance of the engine 105. For example, the ECU 120 concurrently adjusts the spark timing and the variable valve timing of the engine 105 to achieve a maximum fuel efficiency of the engine 105.

Figure 2:
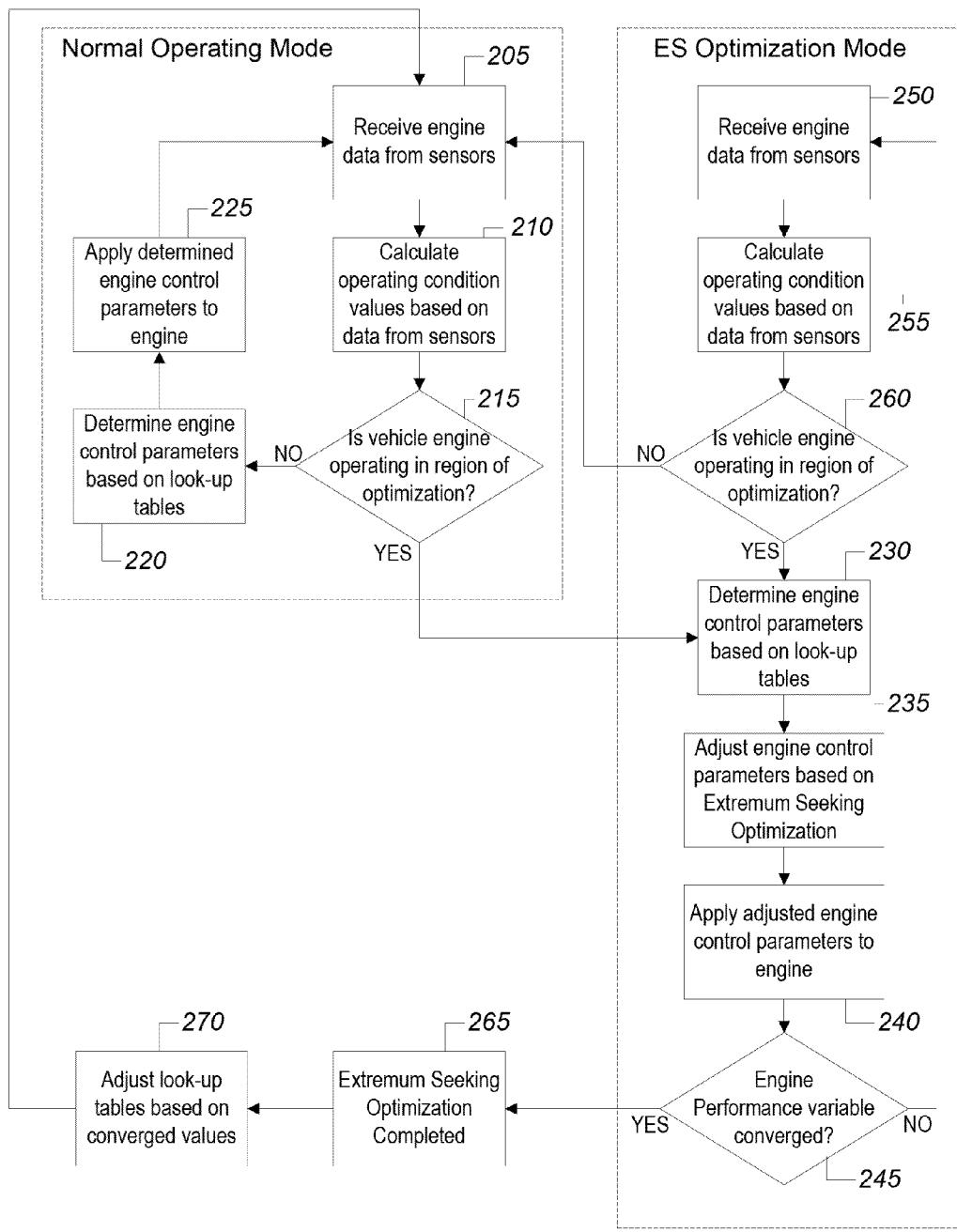
FIG. 2 illustrates a method by which the ECU controls the operation of the engine to achieve improved engine performance.
Figure 4:
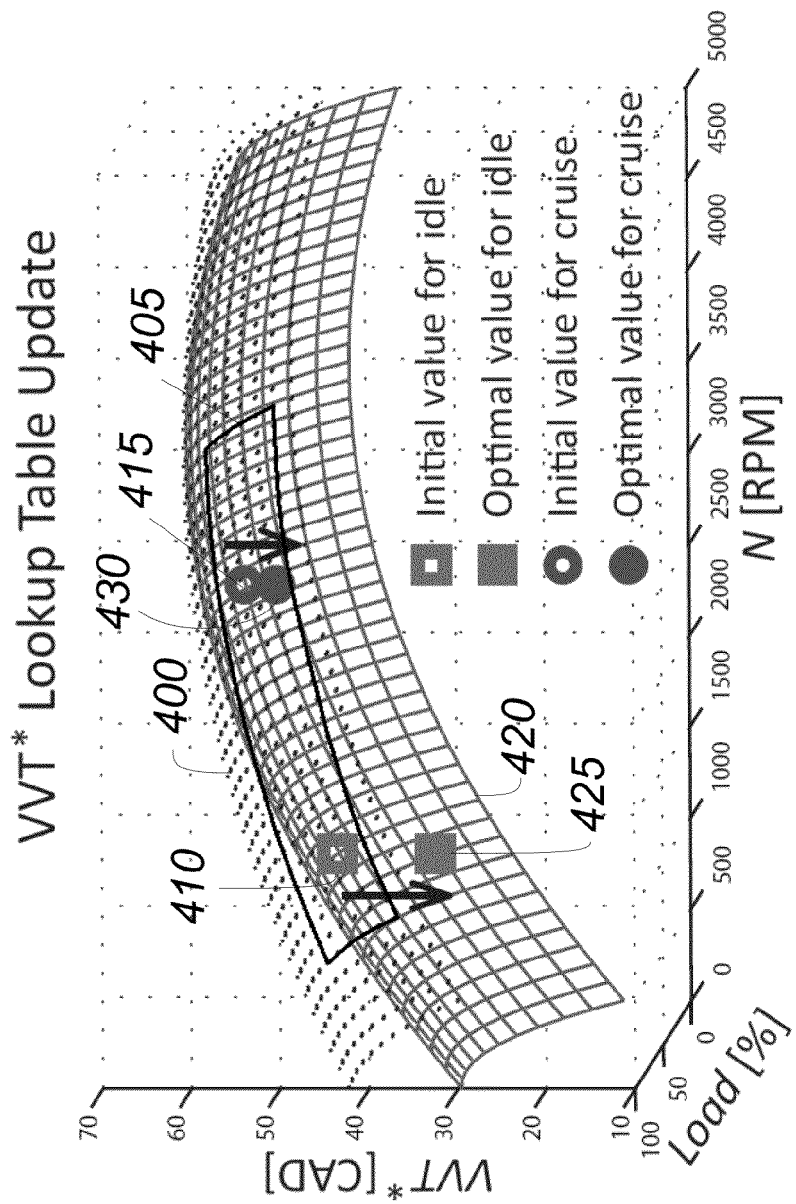
FIG. 4 provides a graphical representation of the engine map look-up table for variable valve timing ("VVT").
Figure 5:
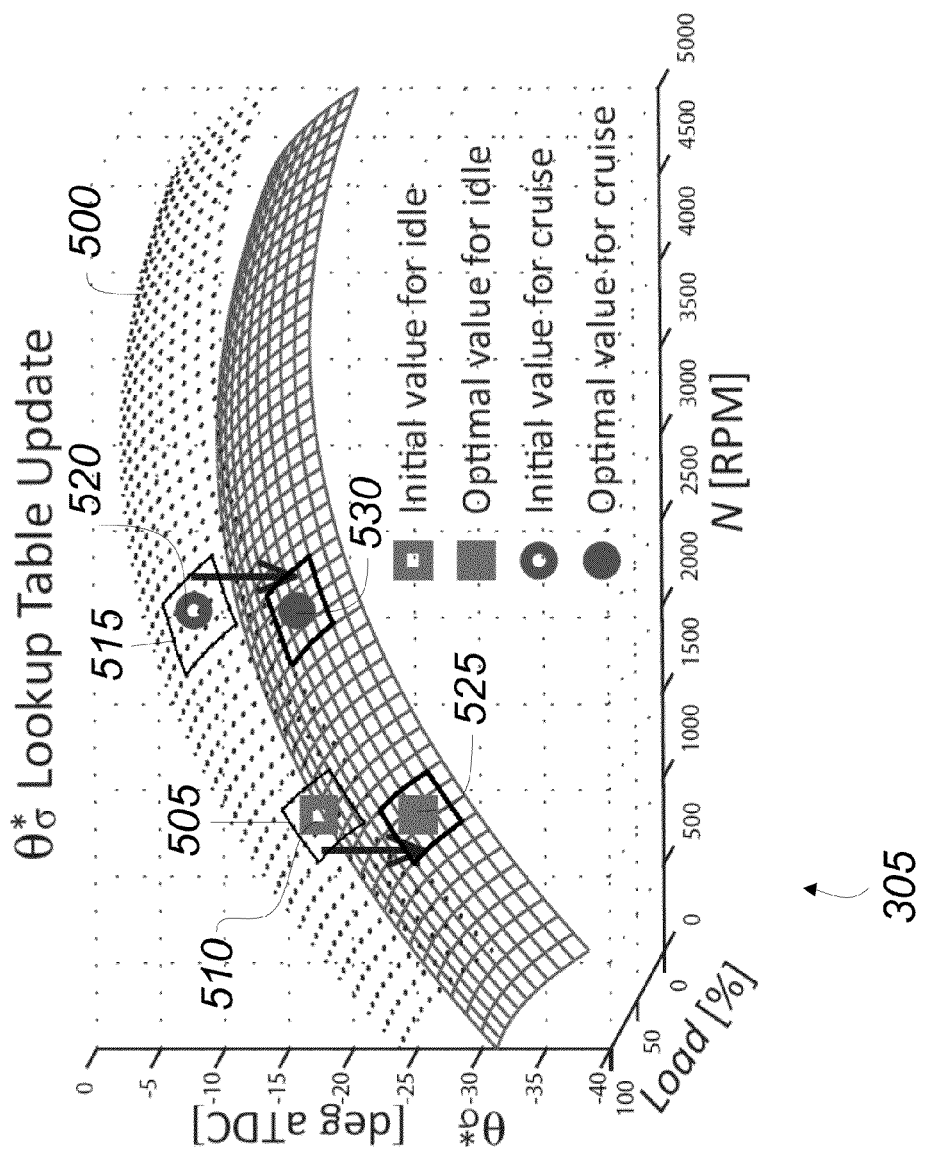
FIG. 5 provides a graphical representation of the engine map look-up table for spark timing.

FIG. 2 illustrates a method by which the ECU 120 controls the operation of the engine 105 to achieve improved engine performance. According to this method, the ECU 120 switches between a normal operating mode and an ES optimization mode. When operating in the normal mode, the ECU 120 receives engine data captured by the speed sensor 110, the pressure sensors 115, and other sensors of the engine 105 (step 205). The ECU 120 processes the data from the sensors and determines a value for each of a plurality of operating conditions of the engine 105, such as engine speed and engine load, based on the sensor data (step 210). The ECU 120 then determines whether the operating conditions fall within a region of optimization (step 215). The region of optimization is defined as a range of operating conditions where the ECU 120 will switch over to the ES optimization control. The range of operating conditions is illustrated in FIGS. 4 and 5 and described in further detail below. If the operating conditions do not fall within the region of optimization, the ECU 120 continues to run in the normal operating mode. The ECU 120 accesses one or more pre-defined engine map look-up tables and determines appropriate engine control parameters (e.g., spark timing and valve timing) based on the determined operating conditions (step 220). The ECU 120 then controls the operation of the engine 105 by applying the determined values for the engine control parameters to the engine 105 (step 225). These steps are repeated at regular intervals as long as the ECU 120 is operating in the normal mode. The normal operating mode is described in more detail below in reference to FIG. 3. If, however, the ECU 120 determines that the operating conditions of the vehicle fall within the region of optimization (step 215), the ECU 120 transitions from the normal operating mode to the ES optimization mode. During the ES optimization mode, the ECU 120 determines an initial value for each of the plurality of engine control parameters based on the pre-defined engine map look-up tables (step 230). The ECU 120 then adjusts the initial values for the engine control parameters based on the results of an extremum seeking optimization process (step 235) before using the adjusted values for the engine control parameters to control operation of the engine 105 (step 240). The details of how the ES optimization process adjusts the initial values of the engine control parameters is described in further detail below in reference to FIG. 6.

The ECU 120 monitors one or more engine performance variables (e.g., fuel efficiency) to determine if and when the engine performance variable has converged toward a target value (step 245). In some cases, as described in further detail below, the target value will be a maximum or minimum achievable value for the engine performance variable. In other cases, where multiple engine performance variables are monitored, the target variable is not a maximum or minimum achievable value, but rather a value defined by an optimal solution of multiple engine performance variables.

If the engine performance variable has not converged toward the target value (step 245), the ECU 120 receives new engine data captured by the sensors (step 250) and determines operating condition values based on the received data from the sensors (step 255). The ECU 120 then verifies that the operating conditions of the vehicle engine 105 still fall within the region of optimization (step 260). As long as the operating conditions of the engine 105 remain in the region of optimization (step 260), the ECU 120 continues to operate in the ES optimization mode (steps 230, 235, 240, 245, 250, 255, and 260) until the engine performance variable converges toward the target value. However, if the operating conditions of the engine 105 are no longer within the region of optimization, the ECU 120 transitions from the ES optimization mode to the normal operating mode.

When the engine performance variable has converged toward the target value (step 245), the ECU 120 terminates the ES optimization mode (step 265) and adjusts values in the pre-defined engine map look-up tables based on adjusted values of the engine control parameters applied to the engine 105 as the engine performance variable converges toward the target value (step 270). The process of updating the engine map look-up tables is described in further detail below in reference to FIGS. 11, 12*a*, and 12*b*.

If the ECU 120 exits the ES optimization mode before the optimization process is completed (step 260), the ECU 120 stores data from the optimization process so that it can continue from where it left off when the operating conditions of the engine 105 re-enter the region of optimization (step 215). Furthermore, as described in detail below, the ES optimization mode determines optimal control parameters that correspond to specific operating conditions of the vehicle. As such, in some embodiments, if the operating conditions of the engine 105 change before the ES optimization is completed, but remain within the region of optimization, the ECU 120 terminates the ES optimization process and restarts the ES optimization process for the new engine operating conditions. In some embodiments, the ECU 120 again stores all data for incomplete ES optimizations so that the optimization process can be resumed when the engine operating conditions return to their previous values.

Figure 3:
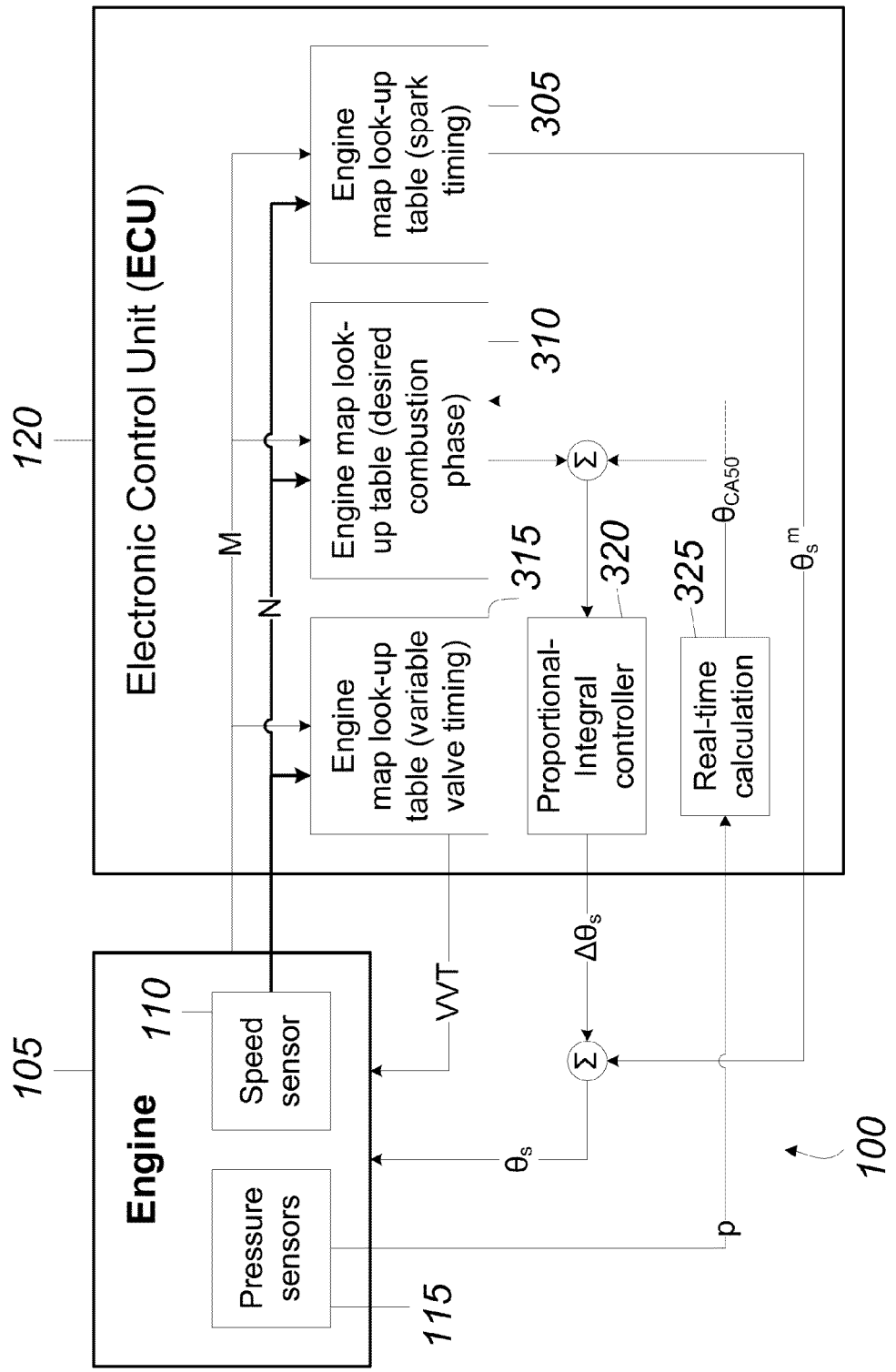
FIG. 3 illustrates an example of a real-time engine control system operating in a normal operating mode.

FIG. 3 illustrates, in greater detail, one example of a real-time engine control system 100 operating in a normal operating mode. The ECU 120 stores and employs an engine map look-up table for spark timing 305, an engine map look-up table for desired combustion phase 310, and an engine map look-up table for variable valve timing 315. The ECU 120 receives values indicative of engine speed (N), engine load (M), and cylinder pressure (p) from the engine sensors. The ECU 120 uses the engine map look-up table 315 to determine an appropriate variable valve timing ("VVT") based on the engine speed (N) and the engine load (M). The VVT includes timing for an intake valve opening ("IVO") and timing for an exhaust valve closing ("EVC"). An example of the engine map look-up table for VVT 315 is illustrated in FIG. 4.

The ECU 120 utilizes the engine map look-up table 305 to determine an initial value for the spark timing ($\theta_s^m$) based on the engine speed (N) and the engine load (M). An example of the engine map look-up table for spark timing 305 is illustrated in FIG. 5. This initial value is offset by a determined value ($\Delta\theta_s$) based on desired combustion phasing before the spark timing ($\theta_s$) is applied to control the operation of the engine 105. To determine the offset value ($\Delta\theta_s$), the ECU 120 uses the cylinder pressure measurements (p) from the pressure sensors 115 to calculate (module 325) a crank angle at which 50% of the total heat release has occurred ($\theta_{CA50}$). This value ($\theta_{CA50}$) is then summed with the output of the engine map-look up table for desired combustion phase 310 and provided to a proportional-integral controller 320. The initial value for the spark timing ($\theta_s^m$) is adjusted based on the output ($\Delta\theta_s$) of the PI controller 320, and the resulting spark timing ($\theta_s$) is applied to control the operation of the engine 105.

FIG. 4 provides a graphical representation of the engine map look-up table for VVT 315. The engine map look-up table for VVT 315 defines a plurality of operating sub-regions 400. Each operating sub-region corresponds to a range of values for the engine speed (N) and a range of values for the engine load (M) (i.e., the small squares on the graph). The engine map look-up table for VVT 315 defines a VVT value corresponding to each operating sub-region. The ECU 120 determines the value for the VVT, as discussed in the paragraphs above in reference to FIG. 3, by identifying a VVT value that corresponds to the detected engine speed (N) and the detected engine load (M) as defined by the engine map look-up table for VVT 315.

FIG. 4 also illustrates a region of optimization 405. The region of optimization 405 includes a range of engine speed (N) values and engine load (M) values. The region of optimization 405 includes multiple operating sub-regions within the engine map look-up table for VVT 315. The ECU 120 defines the region of optimization 405 based on a range of the most commonly detected engine speeds and a range of the most commonly detected engine loads including the operating conditions of the engine 105 at idle 410 and at a cruising speed 415. When the detected engine speed (N) and the detected engine load (M) are within the defined region of optimization 405, the ECU 120 recognizes that the engine 105 is operating in the region of optimization 405 and initiates the ES optimization mode.

As described in further detail below, after completing several executions of the ES optimization for a specific operating sub-region, the ECU 120 overwrites corresponding value in the engine map look-up table for VVT 315 based on an average optimal adjusted value of the VVT. As the ES optimization process is completed multiple times across each operating sub-region within the region of optimization 405, the ECU 120 will eventually adjust the engine map look-up table 315 so that the originally defined values (represented by dotted lines 400) are changed to vehicle specific, optimal values for the VVT (represented by the solid lines 420). For example, as illustrated in FIG. 4, the VVT value corresponding to an engine 105 operating in idle conditions is ultimately adjusted from 410 to 425. Similarly, the VVT value corresponding to an engine 105 operating under cruising conditions is adjusted from 415 to 430.

FIG. 5 provides a graphical representation of the engine map look-up table for spark timing 305. The engine map look-up table for spark timing 305 also defines a plurality of operating sub-regions 500. Each operating sub-region corresponds to a range of values for the engine speed (N) and a range of values for the engine load (M) (i.e., the small squares on the graph). The engine map look-up table for spark timing 305 defines a spark timing value corresponding to each operating sub-region. The ECU 120 determines the value for the spark timing ($\theta_s^m$), as discussed in the paragraphs above in reference to FIG. 3, by identifying a spark timing value that corresponds to the detected engine speed (N) and the detected engine load (M) as defined by the engine map look-up table for spark timing 305.

FIG. 5 also illustrates a region of optimization 505 based on a range of the most commonly detected engine speeds and a range of the most commonly detected engine loads of the vehicle operating at idle 510. In addition, FIG. 5 illustrates another region of optimization 515 based on a range of the most commonly detected engine speeds and a range of the most commonly detected engine loads of the vehicle operating at a cruising speed 520. As shown, the region of optimization 505 for the vehicle operating at idle 510 includes a different range of engine speed (N) values and engine load (M) values than the region of optimization 515 for the vehicle operating at cruising speed 520. Both regions of optimization 505, 515 include multiple operating sub-regions within the engine map look-up table for spark timing 305. When the detected engine speed (N) and the detected engine load (M) are within the defined region of optimization 505, the ECU 120 recognizes that the engine 105 is operating at idle 510 and initiates the ES optimization for the first set of operating sub-regions. If the detected engine speed (N) and the detected engine load (M) are within the other region of optimization 515, the ECU 120 then recognizes that the engine 105 is operating at cruising speed 520 and initiates the ES optimization for the second set of operating sub-regions.

Similarly to the engine map look-up table for VVT 315, as discussed in the paragraphs above in reference to FIG. 4, the ECU 120 will also adjust the engine map look-up table for spark timing 305 after multiple runs of the ES optimization are completed for each operating sub-region within the region of optimization 505 for idle conditions and the region of optimization 515 for cruising conditions. As shown in FIG. 5, the originally defined values (represented by dotted lines 500) are changed to vehicle specific, optimal values for the spark timing (represented by the solid lines). For example, the spark timing value corresponding to an engine 105 operating in idle conditions is eventually adjusted from 510 to 525. Similarly, the spark timing value corresponding to an engine 105 operating under cruising conditions is adjusted from 520 to 530.

Figure 6:
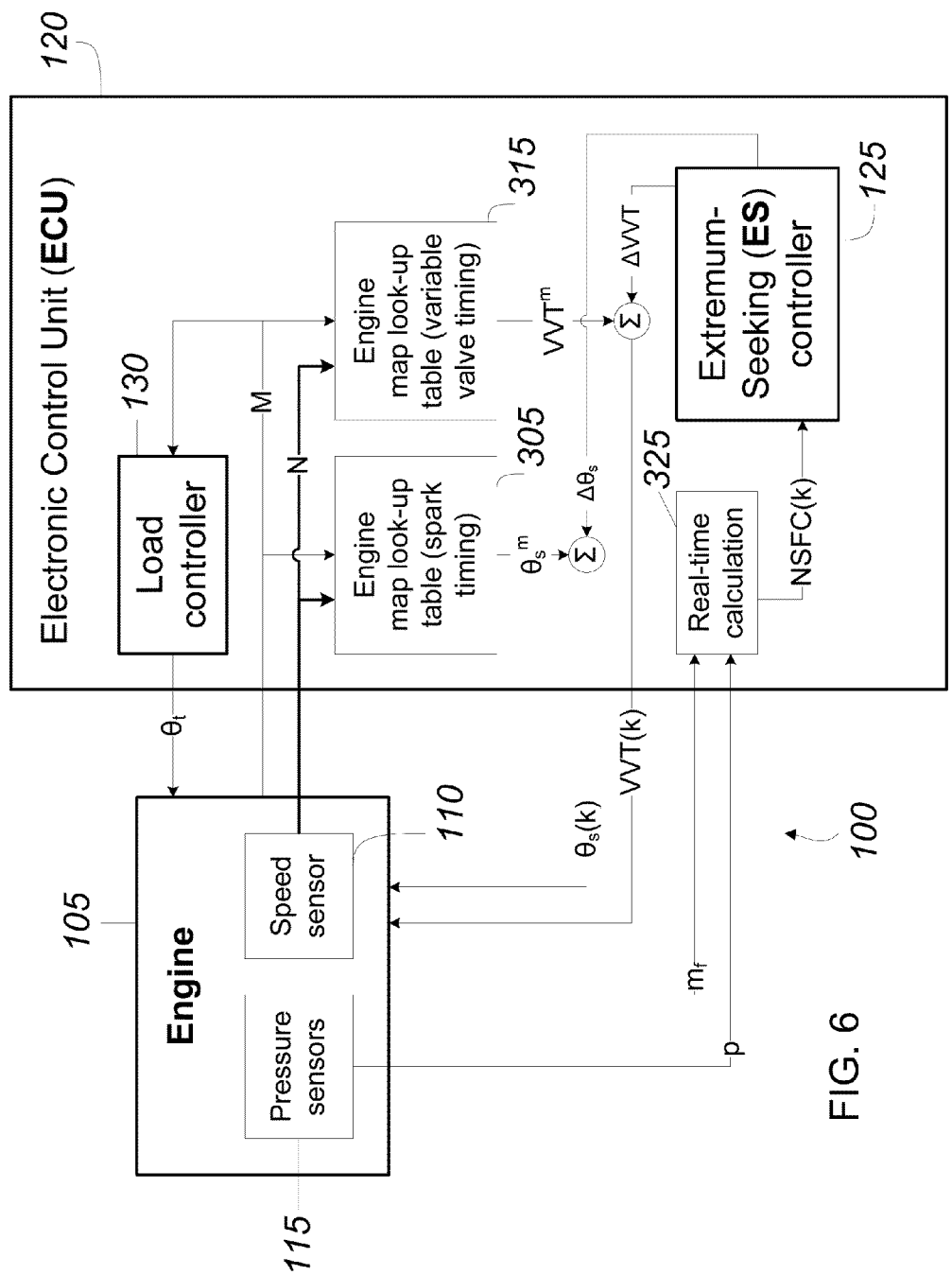
FIG. 6 illustrates operation of the real-time engine control optimization system during the extremum-seeking ("ES") optimization mode of the ECU.

FIG. 6 illustrates, in the embodiment shown, operation of the real-time engine control optimization system 100 during the ES optimization mode of the ECU 120. The ECU 120 employs the engine map look-up table for spark timing 305, the engine map look-up table for variable valve timing 315, the ES controller 125, the load controller 130, and the real-time calculation module 325 to determine the engine control parameters (e.g., spark timing ($\theta_s$) and VVT) and to regulate the detected value of the engine load (M). Outputs of the engine 105 including the cylinder pressure measurements (p) from the pressure sensors 115, engine speed data (N) from the speed sensor 110, engine load data (M), and fuel quantity data ($m_f$) are received and processed by the ECU 120.

Using the cylinder pressure measurements (p) and the fuel quantity ($m_f$), the ECU 120 conducts real-time calculation 325 of a net specific fuel consumption ("NSFC") as well as other combustion features such as the crank angle at which 50% of the total heat release has occurred ($\theta_{CA50}$). Using the engine speed data (N) and the engine load data (M) from the sensors, the ECU 120 determines the operating conditions of the engine 105 including the engine speed (N) and the engine load (M). The ECU 120 also utilizes a memory module 140, not shown in FIG. 3 or in FIG. 6, to store data such as the calculated values of the crank angle at which 50% of the total heat release has occurred ($\theta_{CA50}$). The calculated values of $\theta_{CA50}$ stored in the memory module 140 during the ES optimization mode are used to update the engine map look-up table for desired combustion phase 310, shown in FIG. 3, during the normal operating mode of the ECU 120.

The detected engine speed (N) and the detected engine load (M) are used as inputs to the engine map look-up table for spark timing 305 and the engine map look-up table for variable valve timing 315. The ECU 120 utilizes the engine map look-up table for spark timing 305 to determine an initial value for the spark timing ($\theta s^m$) based on the detected engine speed (N) and the detected engine load (M). The ECU 120 also uses the engine map look-up table for VVT 315 to determine an initial value for the VVT ($VVT^m$) based on the detected engine speed (N) and the detected engine load (M). As described in detail below, the ECU 120 uses the Extremum Seeking (ES) controller 125 to determine a spark timing offset value ($\Delta\theta_s$) and a VVT offset value ($\Delta VVT$). The spark timing offset value ($\Delta\theta_s$) and the VVT offset value ($\Delta VVT$) are applied to the initial values for the spark timing and VVT, respectively, before applying an adjusted spark timing value ($\theta_s(k)$) and an adjusted VVT value (VVT(k)) to the engine 105.

As illustrated in FIG. 6, the ECU 120 uses a spark timing engine map look-up table 305 and a variable valve timing engine map look-up table 315 to adjust two engine control variables concurrently. In some embodiments, the ECU 120 determines the adjusted values for each engine control variable at different periods/frequencies. The ECU 120 can also determine and apply the adjusted engine control parameters alternatingly. For example, the ECU 120 will first determine an adjusted spark timing. After applying the adjusted spark timing to the engine 105, the ECU 120 then determines an adjusted VVT. After applying the adjusted VVT to the engine 105, the ECU 120 again adjusts the spark timing value.

As described above, the ECU 120 uses the ES controller 125 to adjust each engine control parameter to a value that will cause the engine performance variable to approach a target value (e.g., a maximum or a minimum). However, changing the value of one engine control parameter (e.g., spark timing) results in a change in the operating state of the vehicle engine 105. As a result, the other engine control parameter (e.g., VVT) will also need to be adjusted to optimize the performance of the vehicle. Therefore, in some embodiments, when the ES optimization process is used to concurrently adjust multiple engine control parameters to achieve a target engine performance variable, adjusting the initial value for one engine control parameter necessitates a corresponding adjustment of the second engine control parameter in order to cause the engine performance variable to approach the target value.

The ECU 120 determines the spark timing offset value ($\Delta\theta_s$) and the VVT offset value ($\Delta VVT$) by applying the ES controller 125 to a value of an engine performance variable such as the NSFC(k). The ES controller 125 artificially perturbs the determined value of the engine performance variable as described further below in reference to FIGS. 7a and 7b. Because the ES controller 125 determines the spark timing offset value ($\Delta\theta_s$) and the VVT offset value ($\Delta VVT$) based on the value of the engine performance variable, artificially perturbing the value of the performance variable causes a perturbation of the determined offset values.

Figure 7A:
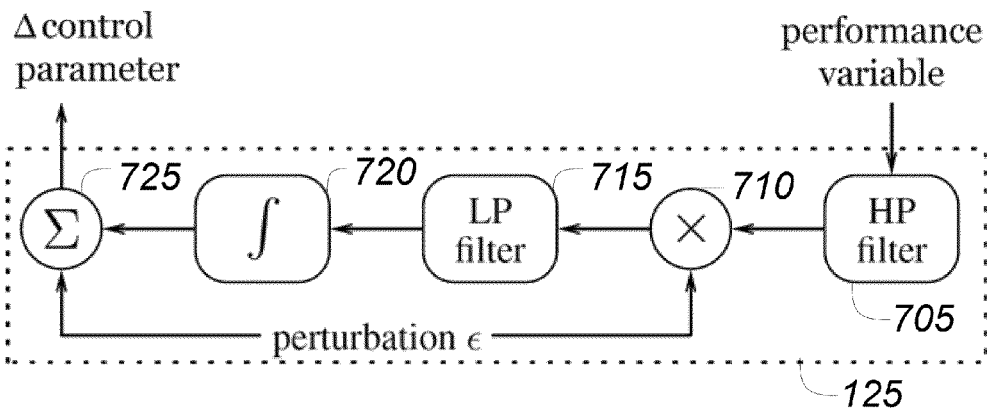
FIG. 7a illustrates an example of a generic form of the operation of an ES controller used to apply an excitation to a control parameter.

FIG. 7a illustrates an example of a generic form of the operation of an ES controller 125 used to apply an excitation to a control parameter, to determine an optimum set-point for the control parameter, and to artificially perturb a performance variable. The ES controller 125 receives the calculated performance variable and applies a high-pass ("HP") filter 705. The first-order HP filter 705 is defined by $(z-1)/(z+h)$ where h is the HP filter cut-off frequency. An artificial perturbation (ε) signal is then applied (710) to the filtered performance variable. The perturbation, ε, is chosen as $$\epsilon(k) = \alpha(-1)^k \quad (1)$$

where k is the iteration number which corresponds to a perturbation with amplitude α, frequency π/T, and phase shift π/2. A low-pass ("LP") filter 715 is then applied to the artificially perturbed performance variable. The first-order LP filter 715 is defined by (1−l)/(z−l) where l is the LP filter cut-off frequency. An integrator 720 is then applied to the filtered performance variable. The integrator 720 is defined by T/(z−1). The artificial perturbation signal, ε(k), is then added (725) to the integrated performance variable to determine the engine control parameter offset value. The perturbation signal applied (710) to the performance variable can include, for example, a sinusoidal excitation or a square-wave excitation. In some embodiments, the amplitude α of the perturbation signal ε(k) decays during the course of a single run of the optimization process and reduces toward zero as the engine control parameter and, therefore, performance variable converge toward the optimum values.

Figure 7B:
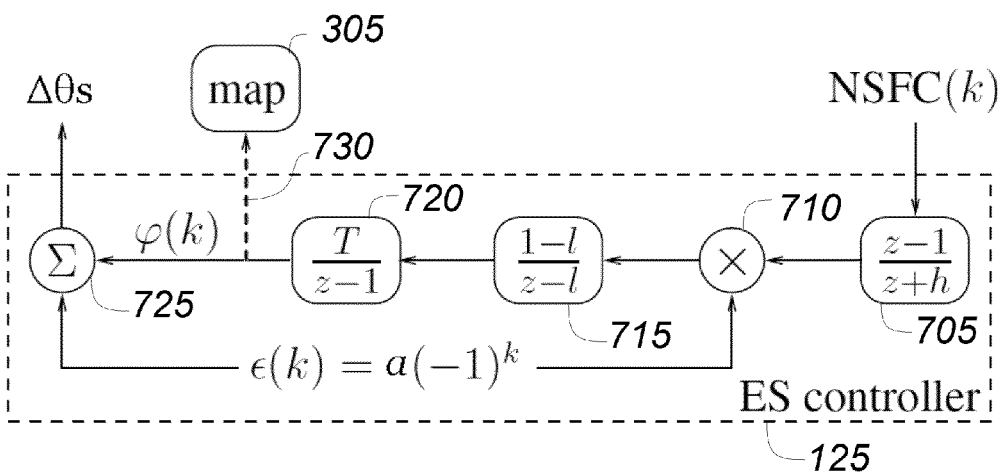
FIG. 7b illustrates an implementation of the ES controller adapted specifically to determine a spark timing offset value.

FIG. 7b illustrates an implementation of the ES controller 125 adapted specifically to determine a spark timing offset value (Δθ$_s$). A similar ES controller process is used by the ES controller 125 of FIG. 6 to concurrently determine a VVT offset value (ΔVVT). The ES controller 125 of FIG. 7b receives a value for the engine performance variable (i.e., NSFC(k)) and determines an offset value that causes the NSFC(k) to approach a target value.

The ES controller 125 of FIG. 7b, applies an excitation to the spark timing, artificially perturbing the engine performance variable, and detecting whether the spark timing has converged toward an optimum set-point until the spark timing converges toward the optimum set-point and the engine performance variable approaches the target engine performance variable. The output of the ES controller 125 after the ES optimization mode has ended is shown with a dotted line 730 and is used in the act of updating the pre-defined engine map look-up table for spark timing 305.

The objective of the ES controller 125 to maximize an engine performance variable such as fuel efficiency by manipulating an engine control variable such as spark timing is obtained by minimizing the net specific fuel consumption ("NSFC"), shown in FIG. 9b below and defined by $$NSFC = \frac{m_i}{W_n} \quad (2)$$

where $m_i$ is the known injected fuel amount for each engine cycle and $W_n$ is the net indicated work per cycle computed from the measured cylinder pressure (p) and known volume V. The objective of the ES controller 125 is to find the optimum spark timing (θ*$_s$), given by $$\theta_s^* = \arg\min_{\theta_s} \left\{ n_c m_i \left( \sum_{k=1}^{n_c} \int p_k dV \right)^{-1} \right\} \quad (3)$$

where $n_c$ is the number of cylinders, $p_k$ denotes the pressure in cylinder k, and the integral is taken over the engine cycle of 720°. The net work $W_n$ is the difference between the gross work $W_g$ and the pumping work $W_p$ which is approximated by $$W_n = W_g - W_p = m_i q_{lhv} \eta - (p_{em} - p_{im}) V_d \quad (4)$$

where $q_{lhv}$ is the lower heating value of the fuel, η is the indicated gross efficiency, ($p_{em}$, $p_{im}$) are the exhaust and intake manifold pressures respectively, and $V_d$ is the displacement.

The amplitude (α) of the perturbation signal ε(k), discussed in the paragraphs above in reference to FIGS. 7a and 7b, is chosen to 1.5 crank angle degrees (cad) as a compromise between good signal to noise ratio for the NSFC and an acceptable level of torque variations. The sample time, denoted by T, is 30 engine cycles, thus $$T = 30 * \frac{120}{N} \text{(seconds)} \quad (5)$$

where N is the engine speed in revolutions per minute ("RPM"). The sample time is chosen so that the engine 105 and the load controller 130 can be approximated as a static nonlinearity for the NSFC as a function of spark timing (θ$_s$). The value of the sample time is based on simulations, showing that the settling time is less than 30 cycles for typical steps in the commanded load.

Figure 8:
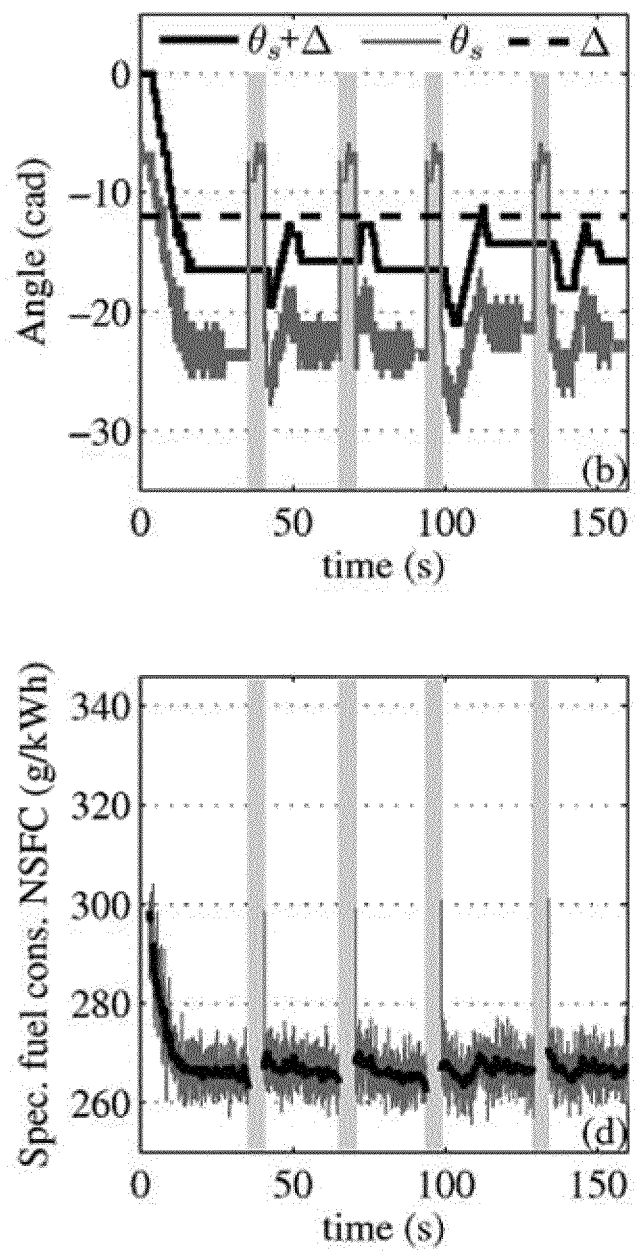
FIG. 8 illustrates a performance variable converging within approximately 20 seconds.

The top graph of FIG. 8 shows a graphical representation of a spark timing (θ$_s$) value provided by the engine map look-up table 305, an artificially introduced disturbance (or perturbation) (Δ), and a perturbed value of spark timing (θ$_s$+Δ) that is actually applied to the engine 105. The bottom graph of FIG. 8 shows the determined engine performance variable (e.g., NSFC) over the same time period for a total of five different runs of the ES optimization routine. The ES controller 125, discussed in reference to FIG. 7b above, is alternatingly activated and de-activated. In the graphs of FIG. 8, the ES controller 125 is de-activated during time periods marked by the gray areas. As discussed above, the ES optimization routine ends when the performance variable converges toward a value. The ES controller 125 of FIG. 7b detects whether the engine control parameter (e.g., spark timing θ$_s$) has converged toward its optimum set-point (θ*$_s$) by monitoring the engine performance variable output (e.g., NSFC). The ES controller 125 detects that convergence has occurred once the engine performance variable output remains within a certain tolerance or does not exceed predetermined maximum and minimum values for a specific amount of time. In the graphs of FIG. 8, the performance variable converges within approximately 20 seconds with an initial disturbance (Δ) of −12 cad from the optimum spark timing. During each run of optimization, the spark timing (θ$_s$) converges toward its optimum set-point and the engine performance variable (NSFC) converges toward a target value.

Figure 9A:
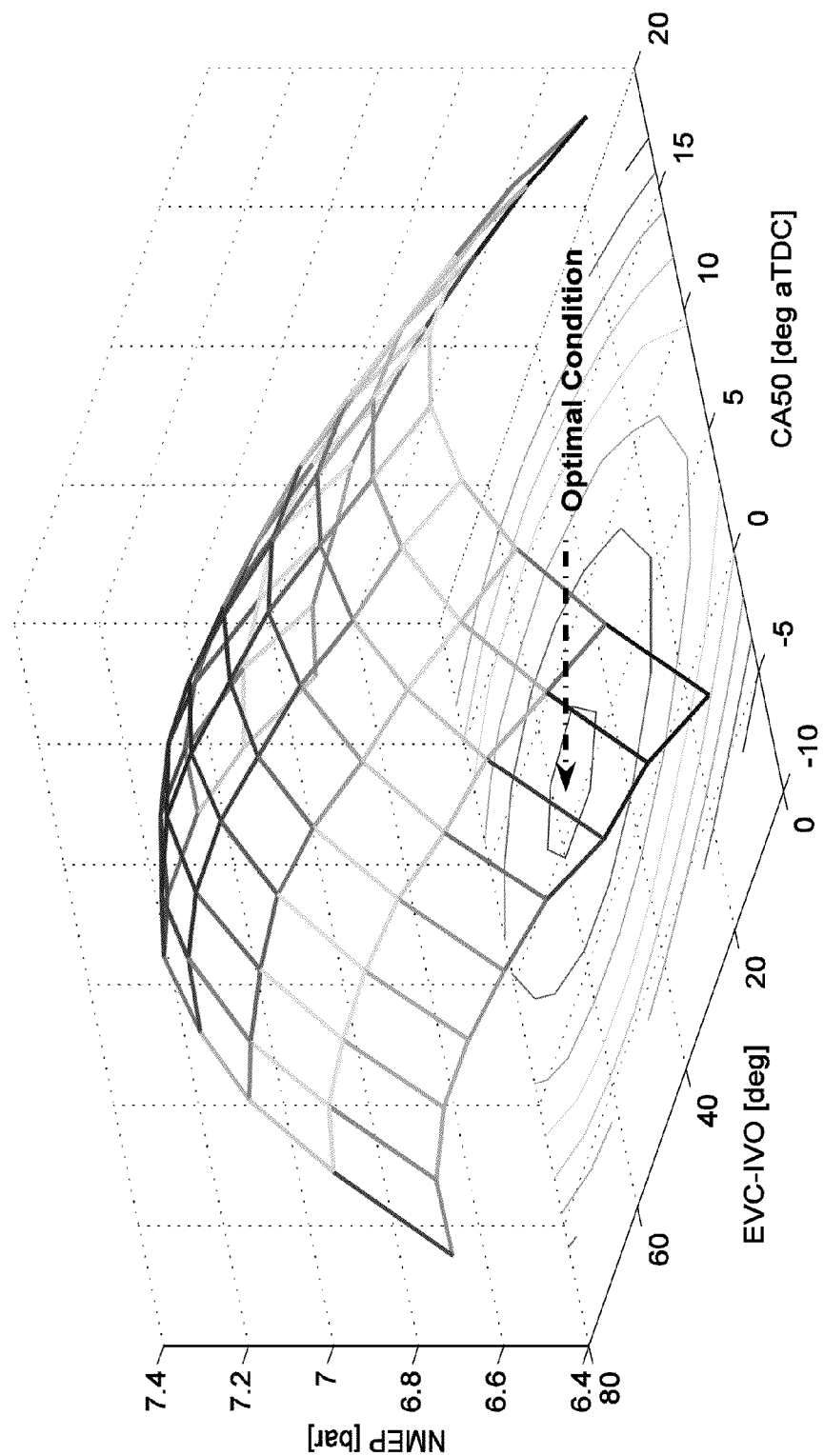
FIG. 9a shows a graphical representation of an engine performance variable such as an estimated net mean effective pressure ("NMEP") for various combinations of VVT positions and combustion phase of $\theta_{CA50}$.

FIG. 9a shows a graphical representation of an engine performance variable such as an estimated net mean effective pressure ("NMEP") for various combinations of VVT (or EVC-IVO) positions and combustion phase of θ$_{CA50}$. This graph illustrates that a maximum value of NMEP can be achieved by applying an optimal combination of engine control variables. The ECU 120 uses an ES controller 125, such as illustrated in FIGS. 7a and 7b, to adjust the engine control parameters until a combination is identified that provides the maximum NMEP value.

Figure 9B:
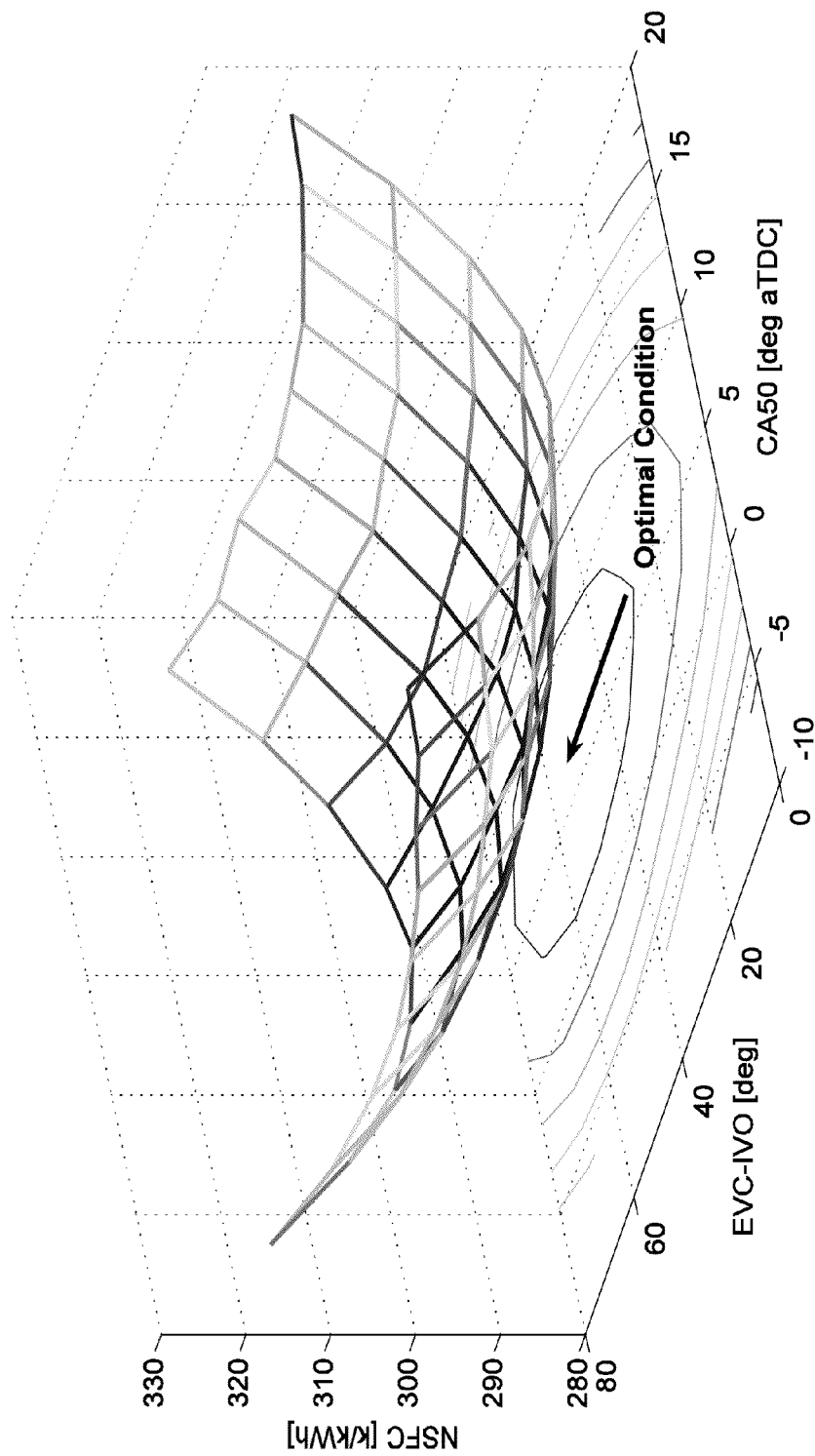
FIG. 9b shows a graphical representation of another engine performance variable—a net specific fuel consumption ("NSFC") for various combinations of VVT positions and combustion phase of $\theta_{CA50}$.

Similarly, FIG. 9b shows a graphical representation of another engine performance variable—NSFC for various combinations of VVT positions and combustion phase of θ$_{CA50}$. This graph illustrates that a minimum value of NSFC can be achieved by applying an optimal combination of engine control variables. The ECU 120 uses an ES controller 125, such as illustrated in FIGS. 7a and 7b, to adjust the engine control parameters until a combination is identified that provides a minimum NSFC value.

In the examples illustrated in FIGS. 9a and 9b, the target value for the engine performance variable is a maximum or minimum achievable value. However, in some circumstances, the target value for the engine performance variable will not necessarily be a maximum or minimum value. In some embodiments, the ECU 120 uses the ES controller 125 to concurrently optimize multiple engine performance variables. In some such cases, it is not possible to achieve maximum or minimum values for all of the engine performance variables. For example, the ES controller 125 may be used to increase fuel efficiency and decrease vehicle emissions. However, the control parameters used to achieve maximum fuel efficiency may not provide the minimum achievable vehicle emissions. In such embodiments, the ECU 120 defines a cost function that balances the values for all of the performance variables to be optimized to achieve an optimal solution instead of attempting to maximize or minimize the values of all of the engine performance variables. The cost function is defined and stored to the ECU 120 and can be adjusted depending on considerations such as the type of vehicle, the intended usage of the vehicle, or local regulation (e.g., vehicle emissions laws).

Figure 10:
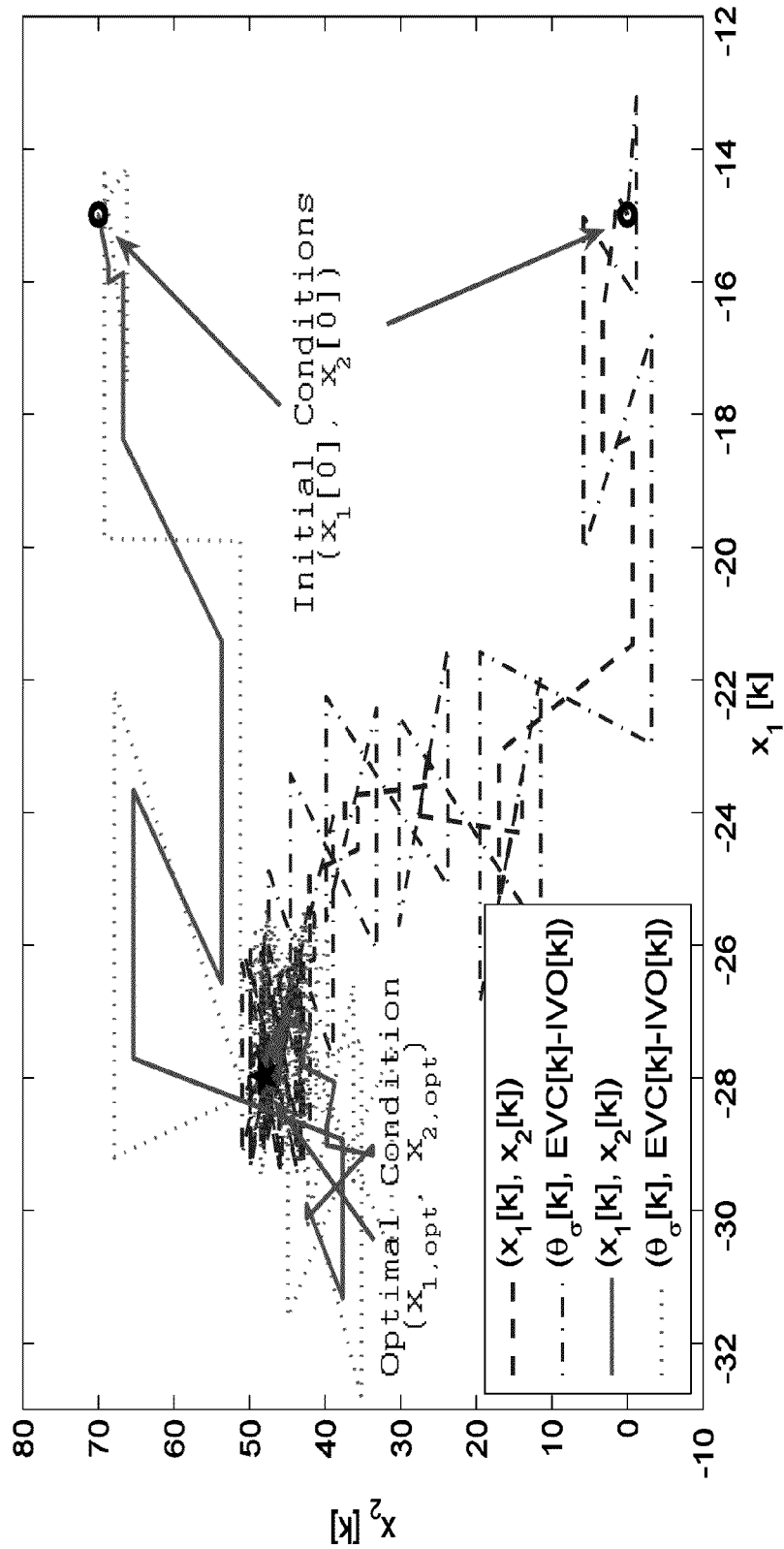
FIG. 10 shows a graphical representation of how the optimization process adjusts an initial combination of engine control parameters until an optimal combination of engine control parameters is attained.

FIG. 10 shows a graphical representation of how the optimization process adjusts an initial combination of engine control parameters (i.e., spark timing and VVT) until an optimal combination of engine control parameters is attained. Each additional run of the optimization process, performed by the ES controller 125, brings the combination of engine control parameters closer to the optimal combination of engine control parameters. Once determined, the optimal combination of engine control parameters, as illustrated in FIG. 10, is applied to the engine 105 to achieve an optimal engine performance.

As described above, the ECU 120 uses engine map look-up tables to determine initial values for control parameters based on detected operating conditions. When operating in the ES optimization mode, the ECU 120 uses the functionality of the ES controller 125 to adjust the values of the control parameters from the engine map look-up tables to achieve a target value of an engine performance variable (e.g., maximized fuel efficiency). The ECU 120 then uses the optimized values of the engine control parameters to update the engine map look-up tables. In this way, the control parameters provided by the look-up tables during subsequent engine operation will be closer to the optimal values. Furthermore, the ECU 120 can improve the specificity of the engine map look-up tables to provide more accurate optimization in areas where small changes to one or more control parameters cause relatively large changes in the engine performance variable.

Figure 12A:
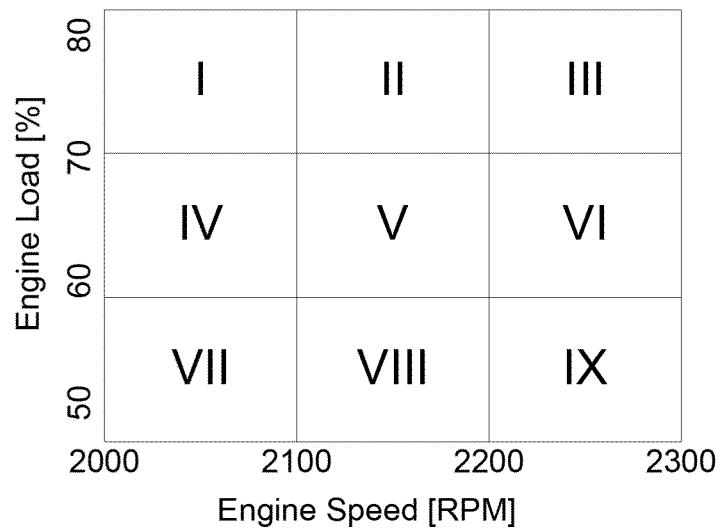
FIG. 12a illustrates one example of an engine map look-up table stored by the ECU including nine operating sub-regions.

FIG. 11 illustrates a method of updating the engine map look-up tables stored on the memory 140 of the ECU 120 after completion of the ES optimization process (step 1105). As described above, the ECU 120 performs a separate ES optimization process for each operating sub-region. FIG. 12a illustrates one example of an engine map look-up table stored by the ECU 120 including nine operating sub-regions. Operating sub-region "I" corresponds to engine loads between 70 and 80% and engine speeds from 2000-2100 RPM. Operating sub-region "II" corresponds to engine loads between 70 and 80% and engine speeds from 2100-2200 RPM. Operating sub-regions "III"-"IX" are similarly defined by ranges of engine speed and engine load. A value of an engine control parameter (e.g., VVT or spark timing) is stored by the engine map look-up table for each operating sub-region.

As described above, the end result after completion of an ES optimization process for a particular operating sub-region (step 1105) is an optimized, converged value for one or more control parameters corresponding to the particular operating sub-region. The ECU 120 stores these converged values to the memory 140 after completion of each ES optimization process. The ECU 120 then accesses a defined number of converged values stored on the memory 140 for the sub-region and calculates an average converged value (step 1110). For example, if the ES controller 125 is being used to determine an optimal VVT setting for the operating sub-region, in one embodiment, the ECU 120 access the previous five converged VVT values stored on the memory 140 corresponding to previous optimization processes completed for the particular operating sub-region and calculates the average.

Before overwriting the stored control parameter for the operating sub-region in the engine map look-up table, the ECU 120 evaluates the sensitivity of the performance variable in the operating sub-region (step 1115). In this example, the ECU 120 determines a magnitude of a change in the fuel efficiency (the performance variable) of the engine 105 resulting from a change in the VVT value. If the magnitude is greater than a defined threshold, the ECU 120 adjusts the specificity of the engine map look-up table at the operating sub-region, as discussed in detail below. In other embodiments, the ECU 120 uses different methodology to evaluate the sensitivity of the engine performance variable at a given operating sub-region. For example, the sensitivity may be calculated based on how quickly the engine performance variable (e.g., fuel efficiency) responds to a change in a control parameter (VVT) or the sensitivity may be evaluated based on a combination of speed of change and magnitude of change.

If the sensitivity of the performance variable is less than the threshold, the ECU 120 stores the average convergence value to the engine map look-up table overwriting the value corresponding to the operating sub-region (step 1120). In some embodiment, the ECU 120 applies a smoothing filter to the data in the engine map look-up table to adjust control parameter values stored in the engine map look-up table for operating sub-regions adjacent to the newly optimized operating sub-region. For example, if the ECU 120 changes the control parameter value stored in the engine map look-up table for operating sub-region "V," the smoothing filter may adjust the control parameter values stored in the engine map look-up table for operating sub-regions I, II, III, IV, VI, VII, VIII, and IX based on the new value stored for operating sub-region V.

Figure 12B:
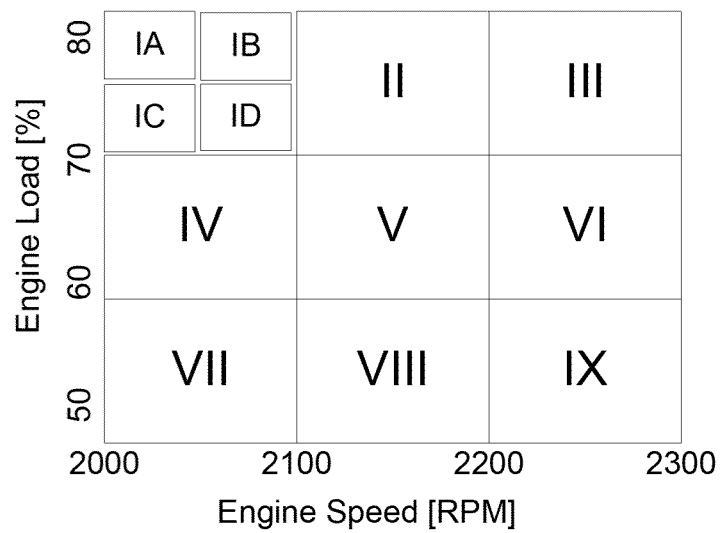
FIG. 12b illustrates one example of an operating sub-region being divided into multiple smaller operating sub-regions to increase the specificity of the engine map look-up table.

As noted above, if the sensitivity of the engine performance variable at the given operating sub-region is greater than a threshold, the ECU 120 increases the specificity of the engine map look-up table for that operating sub-region by dividing the operating sub-region into multiple, smaller operating sub-regions (step 1125). FIG. 12b illustrates one example of an operating sub-region being divided into multiple smaller operating sub-regions to increase the specificity of the engine map look-up table. In FIG. 12b, operating sub-region "I" has been divided into four smaller operating sub-regions—IA, IB, IC, and ID. The ECU 120 begins by storing the average convergence value for the previous operating sub-region "I" to each of the new, smaller sub-regions IA, IB, IC, and ID (step 1130). The values stored for each of the new operating sub-regions will be further adjusted when the ES optimization process is subsequently performed for each of the new operating sub-regions.

Thus, the invention provides, among other things, a system and method for optimizing the performance of a vehicle engine by perturbing the engine control parameters applied to the vehicle engine. Various features and advantages of the invention are set forth in the following claims.

What is claimed is:

1. A method for real-time engine control optimization, the method comprising:
   determining a value of an engine performance variable;
   concurrently detecting a value of a first operating condition of a vehicle engine and a value of a second operating condition of the vehicle engine;
   determining an initial value for a first engine control parameter based on the detected value of the first operating condition and the detected value of the second operating condition;
   adjusting the initial value for the first engine control parameter based on the determined value of the engine performance variable to cause the engine performance variable to approach a target engine performance variable;
   determining an initial value for a second engine control parameter based on the detected value of the first operating condition and the detected value of the second operating condition;
   adjusting the initial value for the second engine control parameter based on the determined value of the engine performance variable to cause the engine performance variable to approach the target engine performance variable; and
   controlling operation of the vehicle engine based on the adjusted initial value for the first engine control parameter and the adjusted initial value for the second engine control parameter,
   wherein adjusting the initial value for the first engine control parameter necessitates a corresponding adjustment of the initial value for the second engine control parameter in order to cause the engine performance variable to approach the target engine performance variable.

2. The method of claim 1, wherein the real-time engine control optimization further includes repeating the acts of determining the value of the engine performance variable, detecting the first operating condition and the second operating condition of the vehicle engine, determining the initial value for the first engine control parameter, adjusting the initial value for the first engine control parameter, determining the initial value for the second engine control parameter, adjusting the initial value for the second engine control parameter, and controlling the operation of the vehicle engine based on the adjusted initial value for the first engine control parameter and the adjusted initial value for the second engine control parameter until the engine performance variable converges toward the target engine performance variable.

3. The method of claim 1, wherein the act of detecting the first operating condition includes detecting an engine speed and wherein the act of detecting the second operating condition includes detecting an engine load.

4. The method of claim 3, wherein the detected engine load is regulated with a closed-loop load controller.

5. The method of claim 1, wherein the act of determining the initial value for the first engine control parameter includes identifying an initial value that corresponds to the detected value of the first operating condition and the detected value of the second operating condition of the vehicle engine as defined by a first engine map look-up table.

6. The method of claim 5, wherein the act of determining the initial value for the second engine control parameter includes identifying an initial value that corresponds to the detected value of the first operating condition and the detected value of the second operating condition of the vehicle engine as defined by a second engine map look-up table.

7. The method of claim 1, wherein the target engine performance variable is a maximum value of the engine performance variable.

8. The method of claim 1, wherein the engine performance variable includes a fuel efficiency of the vehicle engine.

9. The method of claim 1, wherein the first engine control parameter includes a variable valve timing value.

10. The method of claim 9, wherein the variable valve timing includes timing for an intake valve opening and timing for an exhaust valve closing.

11. The method of claim 1, wherein the second engine control parameter includes a spark timing.

12. The method of claim 1, wherein the act of adjusting the initial value for the first engine control parameter based on the determined value of the engine performance variable includes using an extremum seeking controller to apply an excitation to the first engine control parameter to perturb the engine performance variable.

13. The method of claim 12, wherein the excitation to the first engine control parameter includes a sinusoidal excitation.

14. The method of claim 12, wherein the excitation to the first engine control parameter includes a square-wave excitation.

15. The method of claim 1, wherein the acts of adjusting the initial value for the first engine control parameter and adjusting the initial value for the second engine control parameter are performed only when an engine controller is operating in an engine optimization mode, and further comprising:
   repeating the acts of detecting the value of the first operating condition of the vehicle engine and the value of the second operating condition of the vehicle engine, determining an initial value for the first engine control parameter, adjusting the initial value for the first engine control parameter, determining the initial value for the second engine control parameter, and adjusting the initial value for the second engine control parameter until the engine performance variable converges toward the target engine performance variable when operating in the engine optimization mode; and
   ending the engine optimization mode when the engine performance variable converges toward the target engine performance variable.

16. The method of claim 15, wherein the act of determining the initial value for the first engine control parameter includes identifying an initial value that corresponds to the detected value of the first operating condition and the detected value of the second operating condition of the vehicle engine as defined by a first engine map look-up table, the first engine map look-up table defining a plurality of operating sub-regions each corresponding to a range of values for the first operating condition and a range of values for the second operating condition and defining a first engine control parameter value corresponding to each operating sub-region, the method further comprising:
   identifying an optimal adjusted value of the first engine control parameter that causes the engine performance variable to converge toward the target value at the end of the engine optimization mode when the first operating condition and the second operating condition are within a first operating sub-region of the first engine map;
   calculating an average optimal adjusted value of the first engine control parameter for the first operating sub-region of the first engine map based on the optimal adjusted value of the first engine control parameter from a plurality of executions of the engine optimization mode; and updating the first engine map by replacing the first engine control parameter value corresponding to each operating sub-region with the average optimal adjusted value for the first engine control parameter for the first operating sub-region of the first engine map.

17. The method of claim 1, wherein the method steps of adjusting the initial value for the first engine control parameter and adjusting the initial value for the second engine control parameter are done concurrently in order to approach the target engine performance variable.

18. An engine control unit configured to
determine a value of an engine performance variable;
concurrently detect a value of a first operating condition of a vehicle engine and a value of a second operating condition of the vehicle engine;
determine an initial value for a first engine control parameter based on the detected value of the first operating condition and the detected value of the second operating condition;
adjust the initial value for the first engine control parameter based on the determined value of the engine performance variable to cause the engine performance variable to approach a target engine performance variable;
determine an initial value for a second engine control parameter based on the detected value of the first operating condition and the detected value of the second operating condition;
adjust the initial value for the second engine control parameter based on the determined value of the engine performance variable to cause the engine performance variable to approach the target engine performance variable; and
control operation of the vehicle engine based on the adjusted initial value for the first engine control parameter and the adjusted initial value for the second engine control parameter,
wherein adjusting the initial value for the first engine control parameter necessitates a corresponding adjustment of the initial value for the second engine control parameter in order to cause the engine performance variable to approach the target engine performance variable.

19. The engine control unit of claim 18, wherein the act of determining the initial value for the first engine control parameter includes identifying an initial value that corresponds to the detected value of the first operating condition and the detected value of the second operating condition as defined by a first engine map look-up table, and
wherein the act of adjusting the initial value for the first engine control parameter includes updating the first engine map look-up table based on the adjusted initial value for the first engine control parameter.

20. An engine control unit configured to
determine a fuel efficiency of a vehicle engine;
detect an engine speed and an engine load of the vehicle engine;
determine an initial value for variable valve timing based on the detected engine speed and the detected engine load wherein the value for variable valve timing includes at least an opening or closing timing of an intake valve or an exhaust valve of the vehicle engine;
adjust the initial value for the variable valve timing based on the determined fuel efficiency to cause the fuel efficiency of the vehicle engine to approach a maximum value;
determine an initial value for spark timing based on the detected engine speed and the detected engine load;
adjust the initial value for the spark timing based on the determined fuel efficiency to cause the fuel efficiency of the vehicle engine to approach the maximum value; and
control operation of the vehicle engine based on the adjusted initial variable valve timing and the adjusted initial spark timing,
wherein adjusting the initial value for the variable valve timing necessitates a corresponding adjustment of the initial value for the spark timing in order to maximize the fuel efficiency of the vehicle engine.

21. The engine control unit of claim 20, wherein the act of determining the initial value for the variable valve timing includes identifying an initial value that corresponds to the detected engine speed and the detected engine load as defined by a first engine map look-up table, and
wherein the act of adjusting the initial value for the variable valve timing includes updating the first engine map look-up table based on the adjusted initial value for the variable valve timing.

* * * * *